United States Patent

Donley

[15] 3,658,568

[45] Apr. 25, 1972

[54] METHOD OF FORMING METAL OXIDE COATINGS ON REFRACTORY SUBSTRATES

[72] Inventor: Harold E. Donley, Monroeville, Pa.

[73] Assignee: PPG Industries, Inc., Pittsburgh, Pa.

[22] Filed: Aug. 11, 1969

[21] Appl. No.: 849,172

[52] U.S. Cl. .........................117/46, 117/124 B, 117/124 C, 106/1, 264/60, 117/106 R
[51] Int. Cl. ..........................................................C03c 17/22
[58] Field of Search ...........117/46 CC, 124 A, 124 B, 124 C, 117/124 D, 106 R, 46 CA; 264/61, 60; 106/1; 260/413, 414

[56] References Cited

UNITED STATES PATENTS 3,345,199  10/1967  Fitch...................................117/466 A

*Primary Examiner*—William D. Martin
*Assistant Examiner*—M. Sofocleous
*Attorney*—Chisholm and Spencer

[57] ABSTRACT

Metal oxide films are formed on refractory substrates by contacting a hot refractory substrate at a temperature sufficient to pyrolyze a metal soap derived from a carboxylic acid containing a quaternary alpha-carbon atom. Transparent metal oxide films of good optical quality may be formed on glass substrated by pyrolyzing a metal carboxylate derived from a carboxylic acid having about five to about 32 carbon atoms containing a quaternary alpha-carbon atom, for example, metal neodecanoates and neoheptanoates.

10 Claims, No Drawings

METHOD OF FORMING METAL OXIDE COATINGS ON REFRACTORY SUBSTRATES

BACKGROUND OF THE INVENTION

The formation of metal oxide films upon refractory substrates by pyrolysis is a developed art. Metal oxide coatings upon ceramic substrates are frequently utilized as capacitors, resistors, and for other di-electric purposes. Metal oxide coatings upon glass substrates are frequently utilized to achieve unique optical effects and also to obtain electroconductive coatings. Stannous oxide and indium oxide, for examples, have been utilized to form conductive coatings on glass while cobalt oxide and iron oxide and other metal oxides have been widely utilized to form a heat-reflective film on glass. Other metal oxide coatings on glass contribute interesting colors to the glass as well as enhance the solar control properties of the glass.

Metal salts of inorganic acids such as stannous chloride, cobalt chloride, iron chloride, and the like, were utilized in the early stages of the development of this art to form metal oxide films on refractory substrates. However, the inorganic metal salts were found to have certain disadvantages in forming metal oxide films, especially transparent metal oxide films on glass substrates. The metal oxide films were not optically satisfactory and frequently the chloride ion and other anions attacked the glass surface and caused a haze to exist in the film.

Organo-metallic compounds were found to overcome some of the disadvantages of the inorganic metal compounds in forming metal oxide films on refractory substrates. Metal acetates and other metal derivatives of carboxylic acids were utilized to form metal oxide films on glass and other refractory substrates. One of the better film-formers was found to be metal-2-ethylhexanoate, described in U. S. Pat. No. 3,185,586 of Saunders et al. Although the metal-1-ethylhexanoate appeared to be the best film-former of the known metal carboxylic acid derivatives, it has been found to have certain shortcomings; for example, the pyrolytic efficiency, while on a par with other metal carboxylates, is less than that desired and a banding problem occasionally occurs when coating very large sheets of glass.

Although the utilization of metal carboxylates to form metal oxide films by pyrolytic methods had certain advantages, it was discovered that metal acetylacetonates formed good metal oxide films on refractory substrates and overcame some of the disadvantages of the films formed from metal carboxylates. Typical processes involving metal acetylacetonate materials to form metal oxide films are disclosed in U. S. Pat. No. 3,410,710 and Canadian Pat. No. 780,370 of Englehart et al.

The metal acetylacetonates and other metal-1, 3-beta-diketonates, however, exhibit limited solubility in single solvent systems and are substantially insoluble in aliphatic solvents, which are generally preferred as solvents in pyrolytic processes. Canadian Pat. No. 780,370, on pages 11–13, discloses the solubility problems of cobalt acetylacetonate, one of the preferred materials for forming heat-reflective metal oxide films. Also, the acetylacetonate derivatives are formable only with metals having a valence of 2 or greater, thus eliminating silver and other monovalent metals. Also, the metal acetylacetonates are more difficult to prepare than metal carboxylates and are substantially more expensive than metal carboxylates.

INVENTION

It has now been discovered that uniform metal oxide films may be formed pyrolytically on refractory substrates by contacting the hot refractory substrates with a metal carboxylate derived from a carboxylic acid containing a quaternary alpha-carbon atom. The structural formula for these acids whose acid radicals form useful metal carboxylates is as follows:

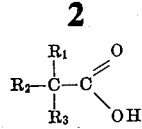

wherein $R_1$, $R_2$, and $R_3$ are organic groups, preferably aliphatic organic groups, especially alkyl groups, having from one to about 10 carbon atoms and wherein $R_1$, $R_2$, and $R_3$ may be the same or different organic groups. The metal portion of these compounds may be any of the metals capable of forming a soap with carboxylic acids and particularly metals which are useful in forming metal oxide films on refractory substrates; for example, metals having an atomic number between 22 and 29 such as cobalt, iron, nickel, chromium, vanadium, titanium, manganese, copper, as well as other metals such as aluminum, tin, indium, silver, and the like.

Typical metal carboxylates useful in this invention include metal neodecanoates, metal neopentanoates, metal neohexanoates, metal neoheptanoates and the like. Metal neodecanoates are especially preferred for their cost. For example, cobalt neodecanoate costs only about one-third that of the acetylacetonate of cobalt.

The metal oxide films according to the practice of this invention are adherent, uniform in appearance, and free from optical defects when formed as transparent films. Transparent films may be readily formed in a full spectrum of colors by utilization of various metals in the coating process. For example, iron oxide films yield a bronze color when viewed reflectively while combinations of copper and manganese provide a blue-grey spectrum of colors by transmission.

The method of forming metal oxide films from metal carboxylates derived from a carboxylic acid having a quaternary alpha-carbon atom are similar to pyrolytic methods presently practiced in the art. The metal carboxylates are generally available as a solution in the carboxylic acid from which they are derived. These solutions are generally about 90 percent by weight of the metal carboxylate, i.e., about 13 per cent by weight of the metal. Other concentrations may be utilized, for example, very low concentrations of metal may be obtained by dilution. For spraying purposes, the metal carboxylate-carboxylic acid solution is generally diluted with an organic solvent or with ammoniated water to form a less viscous solution having from under 1 per cent to about 12 per cent by weight of metal present. The solution is sprayed onto a hot glass substrate at a temperature in the range of about 800° F. to about 1,400° F. although the upper limit of the temperature range is determined by the degradation resistance of the substrate and may be higher than 1,400° F. When optical quality films are formed on transparent glass substrates, the glass substrate is maintained below a temperature at which noticeable sagging occurs. A preferred range for coating glass substrates is between about 900° F. and 1,200° F.

The metal carboxylates of this invention may also be applied by chemical vapor deposition wherein a solution of the metal carboxylate is vaporized and the vapor transported to the refractory substrate which is at a temperature sufficient to cause pyrolysis to occur and cause a metal oxide film to be formed on the substrate. Chemical vapor deposition has advantages for some applications in that the metal oxide films formed are more optically perfect than those formed by spray processes and some of the heat required for pyrolysis is supplied in vaporizing the metal carboxylate, thereby permitting the refractory substrate to be at a somewhat lower temperature than that required for some spray processes. The metal carboxylates containing a quaternary alpha-carbon atom are advantageous in chemical vapor deposition processes over metal-2-ethylhexanoates inasmuch as the latter decompose below their normal boiling point.

The metal carboxylates containing less than about 30 carbon atoms and having a quaternary alpha-carbon atom are applied in compositions containing typical organic solvents for metal organic compounds. These solvents include aliphatic and aromatic solvents, especially those sufficiently volatile for rapid evaporation at film-forming temperatures. Examples include aliphatic solvents such as mineral spirits, heptane, decane, and the like. Aromatic solvents include benzene, toluene, xylene, and the like. Halogenated aliphatic and aromatic solvents are also useful.

Also, the metal carboxylates of this invention may be solubilized in water by treating with ammonia. Water is generally not a preferred solvent in pyrolytic processes inasmuch as its heat of vaporization is higher than most of the organic solvents. However, water has the advantages of being inexpensive, readily available, and non-flammable.

A typical procedure for dissolving a metal carboxylate in water involves forming a suspension of the metal carboxylate-carboxylic acid mixture in water and then bubbling ammonia through the water to achieve a solution of the metal carboxylate and carboxylic acid in the water. Water solutions of metal carboxylate could be readily used in chemical vapor deposition processes wherein the heat of vaporization is supplied prior to contact of the hot refractory substrate with the metal carboxylate.

As mentioned above, the process of this invention is especially useful for forming transparent metal oxide films of good optical quality on glass substrates. The type of glass utilized as the substrate is relatively immaterial so long as the glass can withstand temperatures in the range of 900° F. to 1,200° F. without substantial sagging or degradation. Typical glasses of this sort include soda-lime-silica glasses, boro-silicate glasses, barium crown glasses, high melting phosphate glasses, high-melting lead silicate glasses, and the like. Other refractory materials which may be utilized as a substrate for forming metal oxide films include quartz, china, porcelain, formica, silicon carbide, crystallized glasses, and the like.

EXAMPLE I

The relative solubility of cobalt neodecanoate in mineral spirits (a mixture of aliphatic hydrocarbons having a boiling point ranging between an initial point of 160° C. and an end point of 210° C. was compared with that of cobalt acetylacetonate. Cobalt neodecanoate was very soluble, producing a solution in mineral spirits containing 12.0 per cent by weight of cobalt, whereas cobaltic acetylacetonate was relatively insoluble reaching saturation at a weight content of cobalt of only 0.0067 per cent by weight.

The following experiments were performed to compare the texture and total solar energy reflection (TSE–R) and total solar energy transmission (TSE–T) of cobalt oxide films produced by spraying cobalt neodecanoate and cobalt 2-ethyl hexoate solutions diluted with mineral spirits to produce the metal concentration desired. For each film a different sheet of polished plate glass one-eighth inch thick, 4 inches wide and 5 inches long, was heated to about 1,100° F. and sprayed by a hand gun, using one of the spray compositions tested. The film-forming rate and film texture of each coated sample was observed and the total solar energy reflectance (TSE–R) and transmittance (TSE–T) were measured and recorded in Table I. Each film reported in the various examples had a thickness estimated at about 500 angstroms. This thickness was obtained by stopping the spray operation before an iridescent pattern formed on the surface of the glass sample reported.

TABLE I

CHARACTERISTICS OF COBALT OXIDE FILMS

| Compound | Metal Concentration | Texture | TSE-R | TSE-T |
|---|---|---|---|---|
| 1 A | 6% | Good | 30% | 40% |
| 2 A | 6% | Good | 30% | 41% |
| 3 A | 6% | Good | 27.5% | 41% |
| 4 A | 6% | Good | 28% | 40.5% |
| 5 B | 6% | Good | 31% | 38% |
| 6 B | 6% | Good | 30% | 41% |
| 7 B | 6% | Good | 29% | 39% |
| 8 B | 6% | Good | 30.5% | 41% |
| 9 C | 6% | Good | 28% | 43% |
| 10 C | 6% | Good | 30% | 42% |
| 11 C | 6% | Good | 28.5% | 43% |
| 12 C | 6% | Good | 28% | 42% |
| 13 B | 12% | Fair | 29.5% | 32% |
| 14 B | 12% | Good | 34.5% | 33% |
| 15 B | 12% | Too heavy | 29% | 31% |
| 16 B | 12% | Fair | 30% | 42% |
| 17 C | 12% | Good | 32.5% | 35% |
| 18 C | 12% | Good | 35.5% | 35% |
| 19 C | 12% | Fair | 33% | 37.5% |
| 20 C | 12% | Fair | 29% | 43% |

Legend For Table I

A - Cobalt 2-ethyl hexanoate (Harshaw "octasol")

B - Cobalt neodecanoate (Mooney "TEN-CEM")

C - Cobalt 2-ethyl hexoate (Mooney "HEX-CEM)

The cobalt neodecanoate compositions produced films at a faster rate than the cobalt 2-ethyl hexoate compositions. Increasing the metal content increased the film formation rate. The most rapid film formers were the high metal content neodecanoate compositions. Too much metal content resulted in the loss of control of the amount of film applied. However, the superior solubility of the cobalt neodecanoate made it desirable to test lower metal concentrations of this composition because film texture is generally better at lower metal concentrations than at higher metal concentrations, particularly for solutions having good solubility. Furthermore, the film forming rate is somewhat less at lower metal concentrations and, hence, more readily controllable at mass production operations in plants.

EXAMPLE II

Various float glass sheet samples 18 inches square and one-fourth inch thick were heated to 1,100° F. and sprayed with various organic compounds of cobalt listed in Table II below by a hand gun. In each case, the commercially available organic cobalt compound was diluted to 2 percent metal concentration by weight by adding sufficient methylene chloride to accomplish this purpose. The results observed are described in Table II.

TABLE II
[Film from 2% metal concentration of cobalt compositions in methylene chloride]

| Substituent | Metal content (weight percent) before dilution | Spray time (sec.) | Formation rate |
|---|---|---|---|
| Octoate | 12 | 28 | Slow. |
| "Octasol" (2 ethyl hexoate) | 12 | 28 | Do. |
| Neodecanoate | 12 | 28 | Faster. |
| Acetylacetonate | 16 | 15 | Much faster. |

EXAMPLE III

Filming solutions of cobalt octoate, cobalt octasol and cobalt neodecanoate are diluted in perchlorethylene to 2 percent weight concentration of metal. Films are formed having substantially the same film formation rate as using the spray composition containing methylene chloride as a solvent.

EXAMPLE IV

Glass samples 4 inches by 5 inches × one-fourth inch of plate glass were heated to 1,100° F. and sprayed with copper neodecanoate containing 6 percent weight of copper. Additional heated samples were sprayed with a similar concentration of copper 2-ethyl hexoate. Both of these were diluted to 6 percent metal content in mineral spirits. Copper oxide films were produced with some texture.

The compositions were diluted in mineral spirits to 2 percent metal. The texture of the resulting film was somewhat less than those produced from the 6 percent metal compositions when the dilute copper neodecanoate composition was applied slowly, although there was no appreciable improvement in texture of the film resulting from the dilute copper 2-ethyl composition.

EXAMPLE V

Plate glass samples 4 inches by 5 inches by one-fourth inch were heated to 1,100° F. and sprayed with a copper neodecanoate composition in mineral spirits containing 6 per cent copper to which was added 50 per cent by weight of manganous acetylacetonate dissolved in a solvent mixture containing equal parts by volume of toluene, methanol and methylene chloride. A film resulted that was blue by transmission.

EXAMPLE VI

Float glass plates 4 inches by 6 inches by one-fourth inch were heated to 1,100° F. and sprayed with various compositions containing mixtures of copper with manganese or with manganese and nickel. The tested compositions as received were diluted in mineral spirits and had a total metals content of 6 percent. Methylene chloride was added to reduce the total metals content to 2 percent for the other samples tested. The acetyl acetonates were tested with 2 percent total metals content in an organic solvent as received. The various substituents tested and the results obtained are listed in Table III. The texture of the resulting films was graded A for an excellent film, B for a good film and C for a fair film.

hexoate in the metal proportion recited above dissolved in mineral spirits to which sufficient perchlorethylene was added to reduce the total metals content to 3 percent.

A third set of samples was coated with the second solution of copper neodecanoate, manganese neodecanoate and nickel 2-ethyl hexoate containing 6 percent total metals content in the aforesaid metal proportions dissolved in mineral spirits, which was diluted to 2 percent total metals content by adding sufficient perchlorethylene to do so.

All three formulations produced films matching the color, adhesion and total solar energy reflectance (30 percent) of standard samples produced in the laboratory. It was necessary to adjust the delivery rate of the film forming compositions. The films resulting from the neodecanoate compositions had quality equal to that of the films produced using the acetylacetonates. With the acetyl acetonates costing about three times that of the neodecanoates, it is easy to understand the interest in the neodecanoates as ingredients of film forming compositions.

EXAMPLE VIII

Float glass samples 4 inches by 6 inches by one-fourth inch were heated to 1,100° F. and sprayed with various solutions of cobalt neoheptanoate. All the films formed were free of texture. The cobalt content of each composition tested was 2 percent by weight. Table IV compares the film formation rate of the various compositions tested and the luminous trans- TABLE III
[Properties of mixed oxide films]

| Substituent | Cu | Mn | Ni | Total metal | Film color | Texture | Percent luminous transmittance |
|---|---|---|---|---|---|---|---|
| Neodecanoate | 1.5 | 4.5 | | 6.0 | Vivid, dark blue | C | 32 |
| Do | .8 | 2.6 | 2.6 | 6.0 | Gray | B | 26 |
| 2-ethyl hexoate | 1.5 | 4.5 | | 6.0 | Dull, light blue | C | 38 |
| Do | .8 | 2.6 | | 6.0 | Dull, brownish gray | B | 26 |
| Acetylacetonate | .5 | 1.5 | | 2.0 | Vivid, dark blue | A | 32 |
| Do | .2 | .9 | .9 | 2.0 | Gray | A | 26 |
| Neodecanoate | .5 | 1.5 | | 2.0 | Vivid dark blue | A | 32 |
| Do | .2 | .9 | .9 | 2.0 | Gray | A | 25 |

A study of the experiments reported in Table III reveals that the 2-ethyl hexoate formulations formed too slowly and the proper colors did not develop. The neodecanoate was faster and produced colors equal to the acetylacetonate. The texture of the films produced from compositions having a 6.0 per cent metal concentration level were only fair to good. However, when the neodecanoate solutions were reduced to 2.0 per cent metal, the level of texture of the resulting films was equivalent to the excellent texture of films produced by spraying the acetylacetonate solution of the same metal concentration.

EXAMPLE VII

The following experiments were performed on a regular commercial line using a roller hearth to transport float glass sheets one-fourth inch thick ranging in size from 40 inches by 68 inches to 47 inches by 60 inches through a furnace where the glass sheets were heated to temperatures ranging from 1,165° to 1,180° F. and coated by spray guns operating at atomization pressures ranging from 60 to 70 pounds per square inch. Three different organometallic formulations were used as the film forming compositions for different samples. In each formulation, the weight per cent of the metals were in the ratio of 12 percent copper, 59 percent manganese and 29 percent nickel.

One set of samples was coated with an acetylacetonate solution containing a 2 percent total metals content in a solvent composition consisting by volume of 44.8 percent methylene chloride, 44.8 percent trichlorethylene, 8.6 percent methanol and 1.8 percent meta-cresol.

A second set of samples was coated with a solution containing 6 percent total metals content comprising copper neodecanoate, manganese neodecanoate and nickel 2-ethyl mittance (L.T.) in per cent of the films formed. In addition, results obtained using cobalt neodecanoate and cobalt acetylacetonate compositions containing 2 percent cobalt by weight dissolved in methylene chloride are included in Table IV for comparison.

TABLE IV
[Evaluation of film characteristics produced by organic compositions]

| Cobalt compound | Solvent | Formation rate | Texture | L.T. Percent |
|---|---|---|---|---|
| Neoheptanoate | Methyl chloride | Fast | None | 35 |
| Do | Perchlorethylene | Medium | do | 37 |
| Do | Xylene | do | do | 37 |
| Do | Methanol | do | do | 42 |
| Neodecanoate | Methylene chloride | Fast | do | 37 |
| Acetylacetonate | do | do | do | 36 |

The results of the above experiment led to the conclusion that the presence of the quarternary alpha carbon atom in the neoheptanoate, like that in the neodecanoate, probably was the reason for the superior pyrolytic characteristics of the neoheptanoates tested. In addition, the relative rapidity of the film forming rate of compositions in methylene chloride was noted.

EXAMPLE IX

Tests were performed on float glass sheets 4 inches by 6 inches by one-fourth inch using the so-called chemical vapor deposition process where each tested compound was vaporized and the vapors blasted against a glass sheet heated to 1,200° F. in a carrier of air preheated to about 400° F. In Table V that follows, the column headed "Environment" indicates whether the glass was coated in an environment of 1 atmosphere pressure (denoted by A) or in an environment partially evacuated to 10 inch water pressure (denoted by V). The composition in each case was heated to a temperature above its evaporation point and below its decomposition point as indicated in Table V by the heading "Temp(°F.)Heated," but the glass temperature was above the decomposition point of the film forming composition in each case.

TABLE V

| Compound | Environment | Temp. (°F.) heated | Vaporization | Film forming rate | Film quality |
| --- | --- | --- | --- | --- | --- |
| Co acetylacetonate | A | 700 | Excellent | Fast | Excellent. |
| Co 2-ethyl hexoate | A | 500 | Fair | Slow | Poor (very thin). |
| Co neodecanoate | A | 500 | Excellent | Moderate | Fair. |
| Co 2-ethyl hexoate | V | 500 | Fair | Slow | Poor. |
| Co acetylacetonate | V | 500 | Excellent | Fast | Excellent. |

The conclusions reached from these experiments indicated that of all the materials tested, cobalt neodecanoate compositions were superior as film formers to all others except cobalt acetylacetonate. It was therefore concluded that cobalt neodecanoate compositions provide a likely source of film forming compositions using the chemical vapor deposition technique. Since the cost of cobalt neodecanoate is about one-third as much as that of cobalt acetylacetonate, the commercial benefits of using cobalt neodecanoate are obvious.

What is claimed is:

1. A method of forming transparent metal oxide films on refractory substrates comprising contacting a hot refractory substrate with a metal carboxylate of an organic acid having a quarternary alpha carbon atom and the following structural formula:

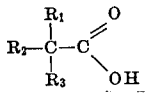

wherein $R_1$, $R_2$, and $R_3$ are aliphatic groups having from about one to about 10 carbon atoms, when said substrate is at a temperature sufficient to cause pyrolysis of the metal carboxylate.

2. The method of claim 1 wherein the metal oxide film is transparent.

3. The method of claim 2 wherein the refractory substrate is a transparent glass sheet.

4. The method of claim 1 wherein the refractory substrate is glass.

5. The method of claim 1 wherein the metal carboxylate is a metal neodecanoate.

6. The method of claim 1 wherein the metal carboxylate comprises metals having an atomic number of 22 to 29 inclusive.

7. The method of claim 1 wherein the metal carboxylate is applied to the hot refractory substrate as a solution in an organic solvent.

8. The method according to claim 1 wherein the metal carboxylate is applied to the refractory substrate as a solution in ammoniated water.

9. The method of claim 1 wherein the metal carboxylate is sprayed as a solution upon the hot refractory substrate.

10. The method of claim 1 wherein the metal carboxylate has been vaporized and transported as a vapor to the hot refractory substrate.

* * * * *